US008316421B2

(12) United States Patent
Etchegoyen

(10) Patent No.: US 8,316,421 B2
(45) Date of Patent: Nov. 20, 2012

(54) SYSTEM AND METHOD FOR DEVICE AUTHENTICATION WITH BUILT-IN TOLERANCE

(75) Inventor: Craig S. Etchegoyen, Irvine, CA (US)

(73) Assignee: Uniloc Luxembourg S.A., Luxembourg (LU)

( * ) Notice: Subject to any disclaimer, the term of this patent is extended or adjusted under 35 U.S.C. 154(b) by 133 days.

(21) Appl. No.: 12/903,948

(22) Filed: Oct. 13, 2010

(65) Prior Publication Data

US 2011/0093920 A1 Apr. 21, 2011

Related U.S. Application Data

(60) Provisional application No. 61/252,960, filed on Oct. 19, 2009.

(51) Int. Cl.
H04L 29/06 (2006.01)

(52) U.S. Cl. .......... 726/4; 726/1; 726/2; 726/3; 726/16; 726/17; 726/21; 726/26; 726/27; 726/30; 713/168; 713/176; 713/177; 713/180; 713/187; 709/217; 709/219; 709/224; 709/225; 709/229

(58) Field of Classification Search .................. 726/1–4, 726/16–21, 22–30; 713/168–170, 180–187; 709/217–219, 223–229
See application file for complete search history.

(56) References Cited

U.S. PATENT DOCUMENTS

| 4,351,982 | A | 9/1982 | Miller et al. |
| 4,658,093 | A | 4/1987 | Hellman |
| 4,704,610 | A | 11/1987 | Smith et al. |
| 4,796,220 | A | 1/1989 | Wolfe |
| 5,113,518 | A * | 5/1992 | Durst et al. ............ 726/29 |
| 5,210,795 | A | 5/1993 | Lipner et al. |
| 5,291,598 | A | 3/1994 | Grundy |

(Continued)

FOREIGN PATENT DOCUMENTS

AU 678985 6/1997

(Continued)

OTHER PUBLICATIONS

Efficient Fingerprint-based User Authentication for Embedded Systems by Gupta et al; Date: Jun. 2005; Publisher: ACM.*

(Continued)

Primary Examiner — Taghi Arani
Assistant Examiner — Madhuri Herzog
(74) Attorney, Agent, or Firm — Sean D. Burdick

(57) ABSTRACT

A system for building tolerance into authentication of a computing device includes a means for executing, from a computer-readable medium, computer-implementable steps of: (a) receiving and storing a first digital fingerprint of the device during a first boot of an authenticating software on the device, the first digital fingerprint based on a first set of device components, (b) receiving a second digital fingerprint from the device at a subsequent time, (c) comparing the second digital fingerprint with a plurality of stored digital fingerprints of known devices, (d) in response to the comparison indicating a mismatch between the second digital fingerprint and the plurality of stored digital fingerprints, generating a request code comprising instructions for the device to generate a third digital fingerprint using the first set of device components, (e) sending the request code to the remote device, (f) receiving the third digital fingerprint from the remote device in response to the request code, and (g) authenticating the device based on a comparison of the first and third digital fingerprints.

6 Claims, 7 Drawing Sheets

U.S. PATENT DOCUMENTS

| | | | |
|---|---|---|---|
| 5,414,269 A | 5/1995 | Takahashi | |
| 5,418,854 A | 5/1995 | Kaufman et al. | |
| 5,440,635 A | 8/1995 | Bellovin et al. | |
| 5,490,216 A | 2/1996 | Richardson, III | |
| 5,666,415 A | 9/1997 | Kaufman | |
| 5,745,879 A | 4/1998 | Wyman | |
| 5,754,763 A | 5/1998 | Bereiter | |
| 5,790,664 A | 8/1998 | Coley et al. | |
| 5,925,127 A | 7/1999 | Ahmad | |
| 5,974,150 A | 10/1999 | Kaish et al. | |
| 6,009,401 A | 12/1999 | Horstmann | |
| 6,044,471 A | 3/2000 | Colvin | |
| 6,158,005 A | 12/2000 | Bharathan et al. | |
| 6,167,517 A * | 12/2000 | Gilchrist et al. | 713/186 |
| 6,230,199 B1 | 5/2001 | Revashetti et al. | |
| 6,233,567 B1 | 5/2001 | Cohen | |
| 6,243,468 B1 | 6/2001 | Pearce et al. | |
| 6,294,793 B1 | 9/2001 | Brunfeld et al. | |
| 6,330,670 B1 | 12/2001 | England et al. | |
| 6,449,645 B1 | 9/2002 | Nash | |
| 6,536,005 B1 | 3/2003 | Augarten | |
| 6,785,825 B2 | 8/2004 | Colvin | |
| 6,859,793 B1 | 2/2005 | Lambiase | |
| 6,920,567 B1 | 7/2005 | Doherty et al. | |
| 6,976,009 B2 | 12/2005 | Tadayon et al. | |
| 7,032,110 B1 | 4/2006 | Su et al. | |
| 7,069,440 B2 | 6/2006 | Aull | |
| 7,069,595 B2 | 6/2006 | Cogmigni et al. | |
| 7,085,741 B2 | 8/2006 | Lao et al. | |
| 7,111,167 B1 | 9/2006 | Yeung | |
| 7,188,241 B2 | 3/2007 | Cronce et al. | |
| 7,203,966 B2 | 4/2007 | Abburi et al. | |
| 7,206,765 B2 | 4/2007 | Gilliam et al. | |
| 7,272,728 B2 | 9/2007 | Pierson et al. | |
| 7,302,590 B2 | 11/2007 | Dublish et al. | |
| 7,319,987 B1 | 1/2008 | Hoffman et al. | |
| 7,327,280 B2 | 2/2008 | Bachelder et al. | |
| 7,337,147 B2 | 2/2008 | Chen et al. | |
| 7,343,297 B2 | 3/2008 | Bergler et al. | |
| 7,420,474 B1 | 9/2008 | Elks et al. | |
| 7,463,945 B2 | 12/2008 | Kiesel et al. | |
| 7,653,899 B1 | 1/2010 | Lindahl et al. | |
| 7,779,274 B2 | 8/2010 | Dublish et al. | |
| 7,934,250 B2 | 4/2011 | Richardson, III | |
| 2001/0034712 A1 | 10/2001 | Colvin | |
| 2001/0044782 A1 | 11/2001 | Hughes et al. | |
| 2002/0019814 A1 | 2/2002 | Ganesan | |
| 2002/0082997 A1 | 6/2002 | Kobata et al. | |
| 2002/0161718 A1 | 10/2002 | Coley et al. | |
| 2003/0033541 A1 | 2/2003 | Edmark et al. | |
| 2003/0065918 A1 | 4/2003 | Wiley | |
| 2003/0084306 A1 | 5/2003 | Abburi et al. | |
| 2004/0024860 A1 | 2/2004 | Sato et al. | |
| 2004/0030912 A1 | 2/2004 | Merkle et al. | |
| 2004/0059929 A1 | 3/2004 | Rodgers et al. | |
| 2004/0143746 A1 | 7/2004 | Ligeti et al. | |
| 2004/0177354 A1* | 9/2004 | Gunyakti et al. | 717/174 |
| 2004/0187018 A1 | 9/2004 | Owen et al. | |
| 2005/0004954 A1* | 1/2005 | Soule, III | 707/203 |
| 2005/0050531 A1 | 3/2005 | Lee | |
| 2005/0108173 A1 | 5/2005 | Stefik et al. | |
| 2005/0138155 A1 | 6/2005 | Lewis | |
| 2005/0172280 A1 | 8/2005 | Ziegler et al. | |
| 2006/0072444 A1 | 4/2006 | Engle et al. | |
| 2006/0095454 A1 | 5/2006 | Shankar et al. | |
| 2006/0161914 A1 | 7/2006 | Morrison et al. | |
| 2006/0169777 A1* | 8/2006 | Colson et al. | 235/386 |
| 2006/0230317 A1 | 10/2006 | Anderson | |
| 2006/0265337 A1 | 11/2006 | Wesinger, Jr. | |
| 2006/0265446 A1* | 11/2006 | Elgressy et al. | 709/200 |
| 2006/0282660 A1 | 12/2006 | Varghese et al. | |
| 2007/0100690 A1 | 5/2007 | Hopkins | |
| 2007/0113090 A1* | 5/2007 | Villela | 713/170 |
| 2007/0136726 A1 | 6/2007 | Freeland et al. | |
| 2007/0168288 A1 | 7/2007 | Bozeman | |
| 2007/0198422 A1 | 8/2007 | Prahlad et al. | |
| 2007/0203846 A1 | 8/2007 | Kavuri et al. | |
| 2007/0219917 A1 | 9/2007 | Liu et al. | |
| 2007/0234409 A1 | 10/2007 | Eisen | |
| 2007/0234427 A1 | 10/2007 | Gardner et al. | |
| 2007/0239606 A1 | 10/2007 | Eisen | |
| 2007/0282615 A1 | 12/2007 | Hamilton et al. | |
| 2008/0005655 A1 | 1/2008 | Sankaran et al. | |
| 2008/0065552 A1 | 3/2008 | Elezar et al. | |
| 2008/0086423 A1 | 4/2008 | Waites | |
| 2008/0147556 A1 | 6/2008 | Smith et al. | |
| 2008/0212846 A1* | 9/2008 | Yamamoto et al. | 382/115 |
| 2008/0228578 A1 | 9/2008 | Mashinsky | |
| 2008/0320607 A1 | 12/2008 | Richardson | |
| 2009/0083730 A1 | 3/2009 | Richardson | |
| 2009/0089869 A1 | 4/2009 | Varghese | |
| 2009/0138975 A1 | 5/2009 | Richardson | |
| 2009/0150330 A1 | 6/2009 | Gobeyn | |
| 2009/0292816 A1 | 11/2009 | Etchegoyen et al. | |
| 2010/0235241 A1 | 9/2010 | Wang et al. | |

FOREIGN PATENT DOCUMENTS

| | | |
|---|---|---|
| EP | 1 637 958 | 3/2006 |
| EP | 1 637 961 | 3/2006 |
| EP | 1 670 188 | 6/2006 |
| EP | 2 267 629 | 12/2010 |
| EP | 2 270 737 | 1/2011 |
| EP | 2 273 438 | 1/2011 |
| EP | 1978454 | 4/2011 |
| GB | 2434724 | 8/2007 |
| WO | WO 92/20022 | 11/1992 |
| WO | WO 93/01550 | 1/1993 |
| WO | WO 95/35533 | 12/1995 |
| WO | WO 98/42098 | 9/1998 |
| WO | WO 2005/104686 | 11/2005 |
| WO | WO 2007/060516 | 5/2007 |
| WO | WO 2008/013504 | 1/2008 |
| WO | WO 2008/127431 | 10/2008 |
| WO | WO 2008/157639 | 12/2008 |
| WO | WO 2009/039504 | 3/2009 |
| WO | WO 2009/065135 | 5/2009 |
| WO | WO 2009/076232 | 6/2009 |
| WO | WO 2009/105702 | 8/2009 |
| WO | WO 2009/143115 | 11/2009 |
| WO | WO 2009/158525 | 12/2009 |
| WO | WO 2010/093683 | 8/2010 |
| WO | WO 2010/104928 | 9/2010 |

OTHER PUBLICATIONS

Primetime BioScreen Web Enabled Kiosek by Timeware; Year: 2005; Publisher: Timeware Inc.*

A survey of forensic characterization methods for physical devices by Khanna et al; Publisher: Elsevier Ltd.; Year: 2006.*

Wikipedia: "Software Extension," May 28, 2009, Internet Article retrieved on Oct. 11, 2010. XP002604710.

"Technical Details on Microsoft Product Activation for Windows XP," Internet Citation, XP002398930, Aug. 13, 2001.

Angha et al.; "Securing Transportation Network Infrastructure with Patented Technology of Device Locking—Developed by Uniloc USA", http://www.dkassociates.com/admin/paperfile/ITS%20World%20Paper%20Submission_Uniloc%20_2_.pdf; Oct. 24, 2006.

Econolite; Econolite and Uniloc Partner to Bring Unmatched Infrastructure Security to Advanced Traffic Control Networks with Launch to StrongPoint; http://www.econolite.com/docs/press/20080304_Econolite_StronPoint.pdf; Mar. 4, 2008.

Williams, R., "A Painless Guide to CRC Error Detection Algorithms," Aug. 13, 1993, 33 pages, www.ross.net/crc/download/crc_v3.txt.

Johnson et al. "Dimensions of Online Behavior: Toward a User Typology," *Cyberpsycology and Behavior*, vol. 10, No. 6, pp. 773-779, 2007. XP002317349.

Lallous, "Changing Volume's Serial Number," Code Project Feb. 17, 2008, retreived from the internet on Dec. 14, 2010. XP002614149.

Lee P, "Oracle Adaptive Access Manager Reference Guide, Release 10g (10.1.4.5)," May 2009, Internet Article retrieved on Sep. 27, 2010. XP002603489.

Williams et al., "Web Database Applications with PHP & MySQL," *O'Reilly Media Chapter 1. Database Applications and the Web* Mar. 2002, Internet Article retrieved on Sep. 21, 2010. XP002603488.

Wikipedia: "Device Fingerprint," May 5, 2009, Internet Article retrieved on Sep. 28, 2010. XP002603492.

Beverly, Robert, "A Robust Classifier for Passive TCP/IP Fingerprinting," *Proceedings of the 5th Passive and Active Measurement Workshop*, Apr. 2004, Juan-les-Pins, France, pp. 158-167.

Eckersley, Peter, "How Unique is Your Web Browser?" *Lecture Notes in Computer Science*, 2010, DOI: 10.1007/978-3-542-14527-8_1, pp. 1-18.

G. Wiesen, "What is a Device Fingerprint?", *WiseGeek*, 2003.

Kohno et al., "Remote Physical Device Fingerprinting," *IEEE Transactions on Dependable and Secure Computing*, vol. 2, No. 2, Apr.-Jun. 2005, pp. 93-108.

Martone et al., "Characterization of RF Devices Using Two-tone Probe Signals," School of Electrical and Computer Engineering, Purdue University, West Lafayette, Indiana, 2007.

Muncaster et al., "Continous Multimodal Authentication Using Dynamic Baysian Networks," Second Workshop on Multimodal User Authentication, Toulouse, France, May 11-12, 2006. XP55003041.

Salo, Timothy J., "Multi-Factor Fingerprints for Personal Computer Hardware," Military Communications Conference, Piscataway, New Jersey, Oct. 29, 2007, 7 pages. XP031232751.

Williath, "Future Grid Portal," *VampirTrace*, Dec. 23, 2010.

* cited by examiner

SYSTEM AND METHOD FOR DEVICE AUTHENTICATION WITH BUILT-IN TOLERANCE

This application claims priority to U.S. Provisional Application No. 61/252,960 which was filed Oct. 19, 2009 and which is fully incorporated herein by reference.

BACKGROUND

1. Field of the Invention

The present invention is directed toward a method and system for building tolerance into comparisons of device fingerprints when authenticating a device.

2. Description of the Related Art

Controlling access to a secured network is one of the biggest challenges for critical infrastructure. Since the majority of existing infrastructures use computers to connect to the Ethernet or Internet, there is an increased possibility for security breaches into such infrastructures. One way to reduce security breaches is to strictly enforce authentication methods such as comparison of password, personal information, secret question, machine identifier, etc. against various stored data and password information. However, in certain approaches, if there is even a slight or minor difference between a device identifier or fingerprint for a device that seeks to be authenticated versus a database of known fingerprints corresponding to known authorized devices, then the request for authentication is rejected or denied.

From a practical standpoint, it is quite possible for a user of a given known device (e.g., a device that is known and authorized to access a secured network), to upgrade, replace, or otherwise modify one or more components of the device. If the device fingerprint may be based on or generated from various device components, including upgraded or modified components, it is quite possible that the known device may no longer have a fingerprint or identifier that will be recognized by the authentication system. For example, a valid device and machine may inadvertently be denied an authenticated status because of upgrade(s) to typical components such as memory, video card, etc. Accordingly, it would be desirable to provide an authentication method with built in flexibility or tolerance to allow for some upgrades or changes to the device.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with a method for allowing tolerance in the authentication process of a digital fingering of a device. By building in tolerance into the authentication process, the risk of rejecting a valid device is reduced. Some tolerance is needed because users may upgrade their hardware and/or software, thus changing the environment of their devices. Once the environment is changed, the authentication software/client one the device may generate a different digital fingerprint. Thus, without built in tolerance, a valid device may be rejected once an upgrade is made to the device.

In accordance with one or more embodiments and corresponding disclosure thereof, various aspects are described in connection with a method for building tolerance into authentication of a device, the method comprising: receiving and storing first digital fingerprint of the device during a first boot of an authenticating software on the device, the first digital fingerprint being based on a first set of device components; receiving a second digital fingerprint from the device at a subsequent time; comparing the second digital fingerprint with a plurality of stored digital fingerprints of known devices; in response to the comparison indicating a mismatch between the second digital fingerprint and the plurality of stored digital fingerprints, generating a request code comprising instructions for the device to generate a third digital fingerprint using the first set of device components; sending the request code to the remote device; receiving the third digital fingerprint from the remote device in response to the request code; and authenticating the device based on a comparison of the first and third digital fingerprints.

In the foregoing method, the first digital fingerprint may be generated using specific components, such as a typical-upgrade list and a non-typical-upgrade list. The typical-upgrade list may comprise one or more components such as graphic card, random access memory, sound card, network adaptor, hard drive, CD/DVD drive, and Ethernet controller. The non-typical-upgrade list may comprise one or more components such as motherboard, USB host controller, central microprocessor, PCI Bus, and System CMOS Clock.

The foregoing method may also include the process of receiving component list of the device at the first boot of the authenticating software on the device. This list of components may be used to generate the request code, which may exclusively comprise components from the list. In this way, a control digital fingerprint may be generated to be compared with the first digital fingerprint.

In one embodiment, the authentication process may further include: generating a control metric by comparing differences between the first and second digital fingerprints. The control metric may identify fingerprint portions and their respective components of the device that generated the differences between the first and second digital fingerprints. The control metric may help identify components missing and/or was upgraded in the device. A second metric may also be generated by comparing differences between the first and third digital fingerprints. Each metric may comprise data identifying a fingerprint portion and associated component that caused the difference. The device may be validly authenticated when the associated component of the control metric and the associated component of the second metric are identical. This means the difference found in the comparison may be caused by a single component. When this is the case, there is a high probability that the changed in the digital fingerprint is caused by an upgrade rather than being caused by an entirely different device.

In the foregoing method, in one embodiment, the authentication server may be configured to parse out the digital fingerprint into a plurality of logical portions. Each logical portion may represent a component corresponding to a fingerprint portion. During the comparison of a received digital fingerprint from the device with stored digital fingerprints of known devices, the authentication server may flag each portion for which it failed to find a match. When the comparison process is completed, the device may be validly authenticated if there are matching portions for at least 75% of the logical portions of the received fingerprint. It should be noted that other percentages could be implemented.

In accordance with yet another embodiment of the present invention a computer readable medium is provided. The computer readable medium having stored thereon, computer executable instructions that, if executed by a device, cause the device to perform a method comprising: receiving a first digital fingerprint from a device having a plurality of digital fingerprint portions, each fingerprint portion being associated with a component of the device; authenticating the received digital fingerprint against stored digital fingerprints; flagging each digital fingerprint portion creating an error during authentication; categorizing associated component of each fingerprint portion as a typical-upgrade component or a non-typical-upgrade component; and granting the digital fingerprint a valid authenticated status when the flagged fingerprint portions have a predetermined typical-upgrade/non-typical-upgrade ratio.

In accordance with yet another embodiment of the present invention, a computer readable medium is provided. The computer readable medium may have stored thereon, computer executable instructions that, when executed by a device, cause the device to perform a method comprising: receiving and storing first digital fingerprint of the device during a first boot of an authenticating software on the device, the first digital fingerprint being based on a first set of device components; receiving a second digital fingerprint from the device at a subsequent time; comparing the second digital fingerprint with a plurality of stored digital fingerprints of known devices; in response to the comparison indicating a mismatch between the second digital fingerprint and the plurality of stored digital fingerprints, generating a request code comprising instructions for the device to generate a third digital fingerprint using the first set of device components; sending the request code to the remote device; receiving the third digital fingerprint from the remote device in response to the request code; and authenticating the device based on a comparison of the first and third digital fingerprints.

In accordance with one or more embodiments and corresponding disclosure thereof, various aspects are described in connection with a method for authenticating a device, the method comprising: comparing the received digital fingerprint with stored digital fingerprints of known devices; flagging each digital fingerprint portion that creates an error during authentication; categorizing associated component of each fingerprint portion as a typical-upgrade component or a non-typical-upgrade component; and granting the digital fingerprint a valid authenticated status when the flagged fingerprint portions exceed a predetermined typical-upgrade/non-typical-upgrade ratio.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention.

DETAILED DESCRIPTION

Figure 1:
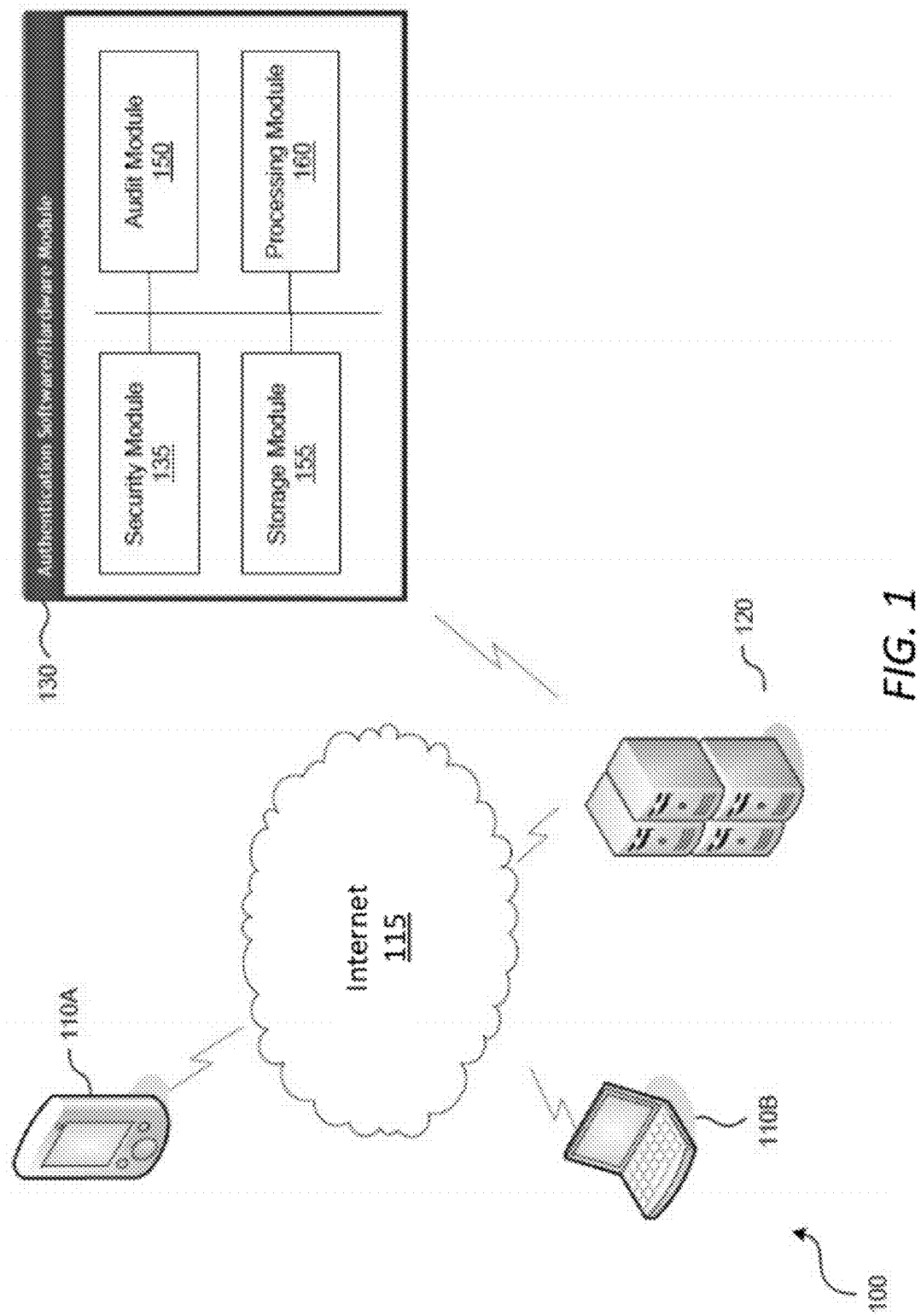
FIG. 1 is a block diagram illustrating an exemplary environment within which a method for authenticating remote devices may be implemented according to one embodiment of the present invention.

Users frequently upgrade their devices with new software and hardware components to keep their devices up to date with current technology. But in upgrading their devices, users may inadvertently make their devices invalid to a digital fingerprint authentication process. During an authentication process, according to one embodiment of the present invention, a digital fingerprint is generated using information from the environment of the device. The information used to generate the digital fingerprint may include information regarding hardware and software components, hardware configurations or statuses, and software version, etc.

By building in tolerance into the authentication process, the risk of rejecting a valid device is reduced. Some tolerance is needed because users may upgrade their hardware and/or software, thus changing the environment of their devices. Once the environment is changed, the authentication client may generate a different digital fingerprint. Thus, without tolerance a valid device may be rejected once an upgrade is made to the device.

According to embodiments of the present invention, a method for authenticating a device is described below. The method described below can also be implemented in a system or a computer apparatus. To authenticate a device, the user may install a standalone authentication client or module on the device. The authentication client may also be an applet application or a software plug-in of another software application, such as, for example, a web browser. On the first install or run of the authentication client, a digital fingerprint ("first boot fingerprint") is generated using information collected on the device's hardware and software environment. The first boot fingerprint may then be stored for later comparison with newly received digital fingerprints during future authentication processes.

The first boot fingerprint may be generated using the overall environmental information collected by the authentication module. Alternatively, the first boot fingerprint may be generated using specific components of the device as predetermined by the authentication client. The specific components may include components from a typical-upgrade components list or a non-typical-upgrade components list. The typical-upgrade components list may include components such as: graphic card, random access memory, sound card, network adaptor, hard drive, CD/DVD drive, Ethernet controller, or other routinely upgraded components. The non-typical-upgrade components list may include components such as: motherboard, USB host controller, central microprocessor, PCI Bus, System CMOS Clock, etc.

In one embodiment, at the first boot of the authentication client, two different digital fingerprints are generated. One of the fingerprints may be generated using only components information from the non-typical-upgrade list, while the other digital fingerprint may be generated using standard technique. This may involve using the information of components from both typical and non-typical upgrade lists or environmental information of the device as a whole to generate the fingerprint instead of using specific components. Once the authentication client generates the digital fingerprints, they may be sent to an authentication server to register the device, if this is the first run of the authentication client. In one embodiment, when the authentication client is not at the first run, only one fingerprint is generated and sent to the authentication server for verification.

Where the device is registering with the authenticating server for the first time, the received digital fingerprints are stored. In a subsequent communication and when the authentication server receives another fingerprint, the later received fingerprint is compared to the stored fingerprint. If a match is found between the latest received fingerprint and one of the stored fingerprints, the device may be validly authenticated. The authentication process may also request the user to enter a username and a password in addition to the verification of the response code.

According to another embodiment of the present invention, the authenticating server may generate a request code, to be transmitted to the device, representing one or more fingerprints of one or more components of a device. The request code may be configured to represent one or more portions of fingerprints of components located in the device. The request code may be transmitted to the device using wireless communication standard such as WiMAX, WiFi, HomeRF, CDMA, or other wireless communication protocol.

The request code may be configured such that when it is read by the device, a response code is generated by the device. The response code comprises one or more portions of the requested fingerprints of components inside the device. For example, the request code may request the following: the first five digits of the serial number of the device; the version of the operating system; and/or the last four digits of the serial number of a microprocessor. In receiving the above request code, the device may collect the requested portions of fingerprints and generate a response code. The response code may be generated using a hash function such as a one-way hash or a two-way hash function using the information gathered in response to the request code.

The response code may be transmitted to an authenticating server via email or short messaging system (SMS). Where SMS is used, the device may be configured to automatically transmit the response code to the authenticating server after receiving and processing the request code. The device may also request a confirmation from the user prior to sending the response code to the authenticating server.

Once the response code is received at the authenticating server, the authenticating server may compare each of the one or more portions of fingerprints with predetermined code(s) or previously stored code(s). Where the device is registering with the authenticating server for the first time, the response code may be translated and stored. If a match is found between the response code and one of the stored codes, the device may be validly authenticated. The authenticating process may also request the user to enter a username and a password in addition to the verification of the response code. Alternatively, the verification of the response code alone is sufficient and verification of the username and password is bypassed. When the device is registering for the first time, the user may be required to enter the username and password.

Before describing the invention in further detail, it is useful to describe an example environment with which the invention can be implemented. FIG. 1 is a diagram illustrating an example environment 100 with which the online commerce restriction, system, and apparatus is implemented according to one or more embodiments of the present invention. The illustrated example environment 100 includes devices 110*a* and 110*b*, a network 115, a server 120, and a software/hardware module 130. Devices 110 may include a security client (not shown) configured to authenticate the device to an authenticating server as generally described above. The security client may comprise a stand-alone application or an applet running within a web browser on the device 110 (e.g., an applet comprising executable code for a Java Virtual Machine). The security client may be embedded in or associated with another software application, including but not limited to a web browser. For example, the security client may be embedded in or associated with a tool bar of a software application, such as, for example, a web browser. The security client may prompt the user to register with an online software registration service, or may run in the background with little or no interaction with the user of device 110.

The security client may also be digitally distributed or streamed from one or more servers. Network 115 may comprise the Internet, a local area network, or other form of communication network.

Referring again to FIG. 1, computing devices 110*a-b* may be in operative communication with authenticating server 120. While only one computing device 110 is illustrated, it will be understood that a given system may comprise any number of computing devices. Computing device 110 may be, but is not limited to, a mobile phone, netbook, a mobile game console, mobile computing device, a tablet computer, a personal digital assistant, a wireless communication device, an onboard vehicle computer, or any other device capable of communication with a computer network.

Per the request code received from the authenticating server or manually entered by the user of the device, the security client may collect information regarding computing device 110, as instructed by the request code. The request code may comprises information or instruction telling the security client to collect a number of parameters which are expected to be unique to the computing device environment. The parameters collected may include, for example, hard disk volume name, user name, device name, user password, hard disk initialization date, etc. The collected information may include information that identifies the hardware comprising the platform on which the web browser runs, such as, for example, CPU number, or other parameters associated with the firmware in use. The system information may further include system configuration information, such as amount of memory, type of processor, software or operating system serial number, etc.

Based on the collected information, the security client may generate a response code based on one or more identifiers or fingerprints 224 (see FIG. 2) that is unique to each component of computing device 110. The term device identifier, as used herein, refers to one or more fingerprints of hardware and software components inside of device 110. The request code may include a code that represents the device identifier, which is a fingerprint of a component of device 110. As mentioned above, the request code may specify one or more portions of a fingerprint (device identifier) of a component of device 110. Alternatively, the request code may specify one or more fingerprints in whole.

The device identifier 224 may be generated and stored in a hidden directory of the device 110 and/or at a remote location, such as the server 120. The device identifier 224 may incorporate the device's IP address and/or other geo-location code to add another layer of specificity to device's unique identifier.

It is noted that the security client running on the computing device or otherwise having access to the computing device's hardware and file system may generate a unique device identifier (e.g., device identifier 224) using a process that operates on data indicative of the computing device's configuration and hardware. The device identifier may be generated using a combination of user-configurable and non-user-configurable machine parameters as input to a process that results in the device identifier, which may be expressed in digital data as a binary number. Each machine parameter is data determined by a hardware component, software component, or data component specific to the device that the unique identifier pertains to. Machine parameters may be selected based on the target device system configuration such that the resulting device identifier has a very high probability (e.g., greater than 99.999%) of being unique to the target device. In addition, the machine parameters may be selected such that the device identifier includes at least a stable unique portion up to and including the entire identifier, that has a very high probability of remaining unchanged during normal operation of the target device. Thus, the resulting device identifier should be highly specific, unique, reproducible and stable as a result of properly selecting the machine parameters. Once the device identifier is generated, a response code is produced using specific portions of the device identifier as requested by the request code.

The application for generating the device identifier may also operate on the collected parameters with one or more algorithms to generate the device identifier. This process may include at least one irreversible transformation, such as, for example, a cryptographic hash function, such that the input machine parameters cannot be derived from the resulting device identifier. Each device identifier, to a very high degree of certainty, cannot be generated except by the suitably configured application operating or otherwise having had access to the same computing device for which the device identifier was first generated. Conversely, each identifier, again to a very high degree of certainty, can be successfully reproduced by the suitably configured application operating or otherwise having access to the same computing device on which the identifier was first generated.

The application may operate by performing a system scan to determine a present configuration of the computing device. The application may then select the machine parameters to be used as input for generating the unique device identifier. Selection of parameters may vary depending on the system configuration. Once the parameters are selected, the application may generate the identifier.

Further, generating the device identifier may also be described as generating a device fingerprint and may entail the sampling of physical, non-user configurable properties as well as a variety of additional parameters such as uniquely generated hashes and time sensitive values. Physical device parameters available for sampling may include, for example, unique manufacturer characteristics, carbon and silicone degradation and small device failures.

The process of measuring carbon and silicone degradation may be accomplished by measuring a chip's ability to process complex mathematical computations, and its ability to respond to intensive time variable computations. These processes measure how fast electricity travels through the carbon. Using variable offsets to compensate for factors such as heat and additional stresses placed on a chip during the sampling process allows for each and every benchmark to reproduce the expected values. During a standard operating lifetime, the process of passing electricity through the various switches causes a computer chip to degrade. These degradations manifest as gradually slower speeds that extend the processing time required to compute various benchmarking algorithms.

In addition to the chip benchmarking and degradation measurements, the process for generating a device identifier may include measuring physical, non-user-configurable characteristics of disk drives and solid state memory devices. Each data storage device has a large variety of damage and unusable data sectors that are nearly unique to each physical unit. The ability to measure and compare values for damaged sectors and data storage failures provides a method for identifying storage devices.

Device parameter sampling, damage measurement and chip benchmarking make up just a part of device fingerprinting technologies described herein. These tools may be further extended by the use of complex encryption algorithms to convolute the device identifier values during transmission and comparisons. Such encryption processes may be used in conjunction with random sampling and key generations.

The device identifier may be generated by utilizing machine parameters associated with one or more of the following: machine model; machine serial number; machine copyright; machine ROM version; machine bus speed; machine details; machine manufacturer; machine ROM release date; machine ROM size; machine UUID; and machine service tag.

The device identifier may also be generated by utilizing machine parameters associated with one or more of the following: CPU ID; CPU model; CPU details; CPU actual speed; CPU family; CPU manufacturer; CPU voltage; and CPU external clock.

The device identifier may also be generated by utilizing machine parameters associated with one or more of the following: memory model; memory slots; memory total; and memory details.

The device identifier may also be generated by utilizing machine parameters associated with one or more of the following: video model; video details; display model; display details; audio model; and audio details.

The device identifier may also be generated by utilizing machine parameters associated with one or more of the following: network model; network address; Bluetooth address; Blackbox model; Blackbox serial; Blackbox details; Blackbox damage map; Blackbox volume name; NetStore details; and NetStore volume name.

The device identifier may also be generated by utilizing machine parameters associated with one or more of the following: optical model; optical serial; optical details; keyboard model; keyboard details; mouse model; mouse details; printer details; and scanner details.

The device identifier may also be generated by utilizing machine parameters associated with one or more of the following: baseboard manufacturer; baseboard product name; baseboard version; baseboard serial number; and baseboard asset tag.

The device identifier may also be generated by utilizing machine parameters associated with one or more of the following: chassis manufacturer; chassis type; chassis version; and chassis serial number.

The device identifier may also be generated by utilizing machine parameters associated with one or more of the following: IDE controller; SATA controller; RAID controller; and SCSI controller.

The device identifier may also be generated by utilizing machine parameters associated with one or more of the following: port connector designator; port connector type; port connector port type; and system slot type.

The device identifier may also be generated by utilizing machine parameters associated with one or more of the following: cache level; cache size; cache max size; cache SRAM type; and cache error correction type.

The device identifier may also be generated by utilizing machine parameters associated with one or more of the following: fan; PCMCIA; modem; portable battery; tape drive; USB controller; and USB hub.

The device identifier may also be generated by utilizing machine parameters associated with one or more of the following: device model; device model IMEI; device model IMSI; and device model LCD.

The device identifier may also be generated by utilizing machine parameters associated with one or more of the following: wireless 802.11; webcam; game controller; silicone serial; and PCI controller.

Figure 2:
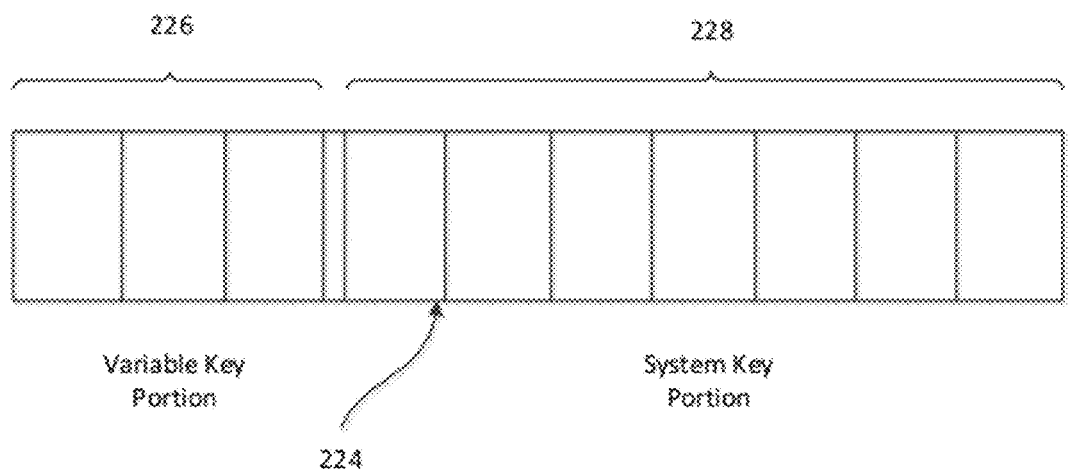
FIG. 2 is a block diagram representing memory allocation for a device identifier used in accordance with principles of the present invention.

With reference to FIG. 2, in one embodiment, the device identifier 224 may include two components—namely, a variable key portion 226 and a system key portion 228. The variable key portion 226 may be generated at the time of registration of computing device 110 by reference to a variable platform parameter, such as via reference to system time information, although other parameters which are variable may be utilized in other embodiments. The system key portion 228 may include the above described parameters expected to be unique to the device 110, such as, for example, hard disk volume name, user name, computer name, user password, hard disk initialization date, or combinations thereof. Portions 226 and/or 228 may be combined with the IP address and/or other platform parameters of the device 110. It is noted that device identifiers, or portions thereof, may be encrypted to add an additional layer of specificity and security.

Referring again to FIG. 1, authenticating server 120 may comprise a hardware/software authentication module 130, which may include a security module 135, an audit module 150, a storage module 155, and a processing module 160. Security module 135 may be configured to authenticate the response code comprising one or more portions of device identifier 224 received from the security client on computing device 110. Alternatively, the response code may be sent in by the user via email or a web application.

The security client of computing device 110 may also include a registration routine that collects or receives information regarding the geo-location code of the device 110. A geo-locater (not shown) may comprise the IP address or the like of the device 110.

The security client may electronically send device identifier 224 and financial information to authenticating server 120. In the alternative, or in addition, a geo-location code, such as the IP address of the device 110, may be associated with the device identifier 224 and may be sent to the authenticating server 120, such as via a secured network connection. The authenticating server 120 may encrypt and store the data, such as the device identifier 224 and/or the geo-location code received from the computing device 110. Authenticating server 120 may also receive such data from a plurality of computing devices and store the received data in storage module 155. Authenticating server 120 may also generate a transaction identifier for the event or item of commerce the user is seeking to purchase. In one embodiment, the transaction identifier is transmitted to the security client for auditing purposes.

In one embodiment, the audit module 150 may generate an audit number by associating the transaction identifier with device identifier 224 and/or the geo-location code, and stores the generated audit number in storage module 155.

In one embodiment, security client of device 110 may send the device identifier 224 and/or the geo-location code to the server 120 in a piecemeal manner. The server 120 may in turn generate the audit number 142. Authenticating server 120 may receive or generate audit numbers from a plurality of computing devices and store the received audit numbers in the storage module 155.

It is noted that the audit number may be generated from device identifier 224, the transaction identifier, and/or the geo-location code via any number of suitable approaches. For example, the transaction identifier may be concatenated or linked with device identifier 224 and/or the geo-location code. It is also noted that the audit number may be stored in a hidden directory of computing device 110 and/or at a remote location, such as the authenticating server 120. It is further noted that device identifier 224, the transaction identifier, and/or the geo-location code may be extracted from the audit number 142 at a later time.

Audit module 150 may be configured to keep track of all sales and purchases of event tickets, goods, and services. Audit module 150 may record each purchase of the event tickets, goods, and services. Audit module 150 may also record the purchase date, purchase price, event/goods/service identifier, user's 405 financial data, device identifier, etc. Audit module 150 may store the collected data in storage module 155.

Figure 3A:
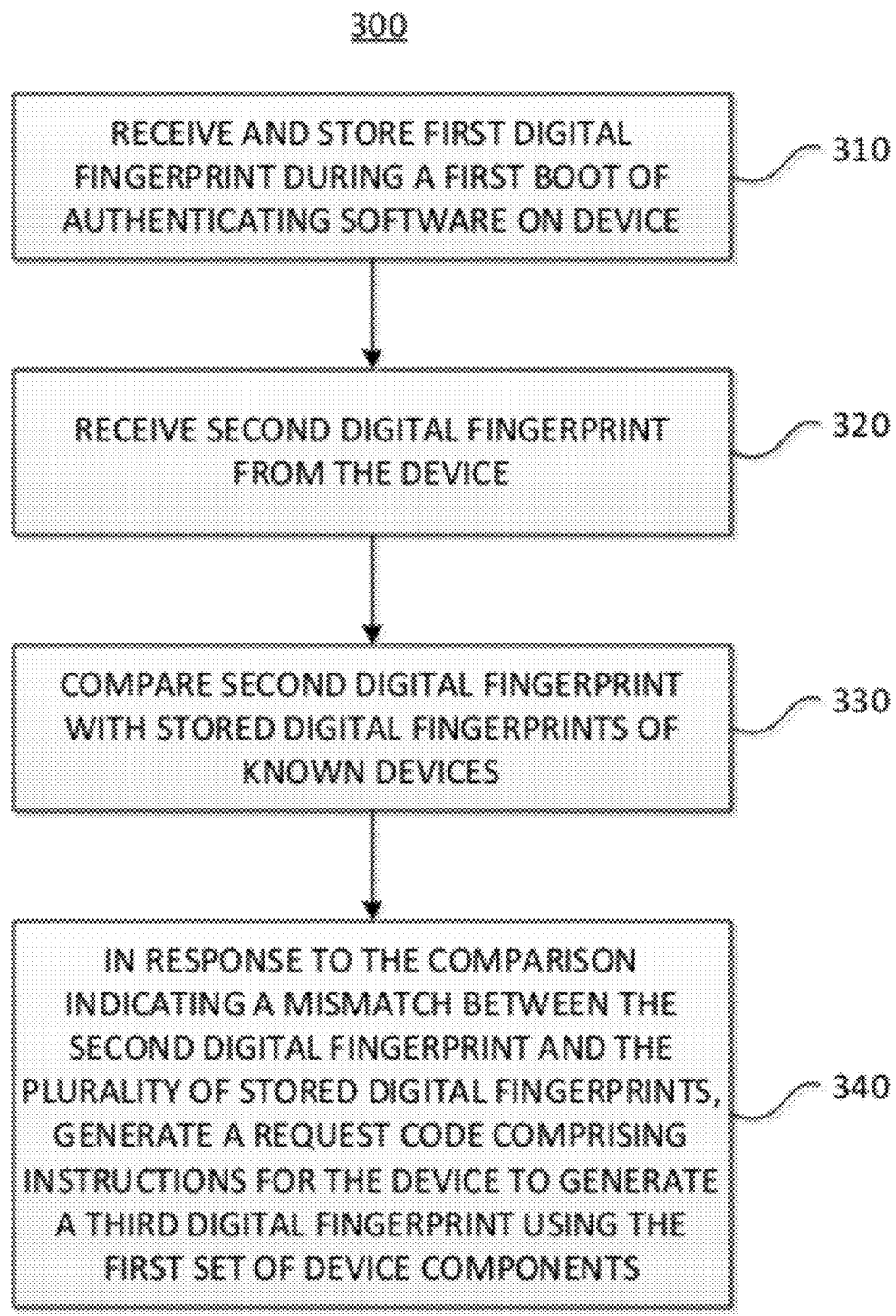
FIG. 3A is a process flow chart illustrating one embodiment of a method according to the invention for device authentication with built-in tolerance.
Figure 3B:
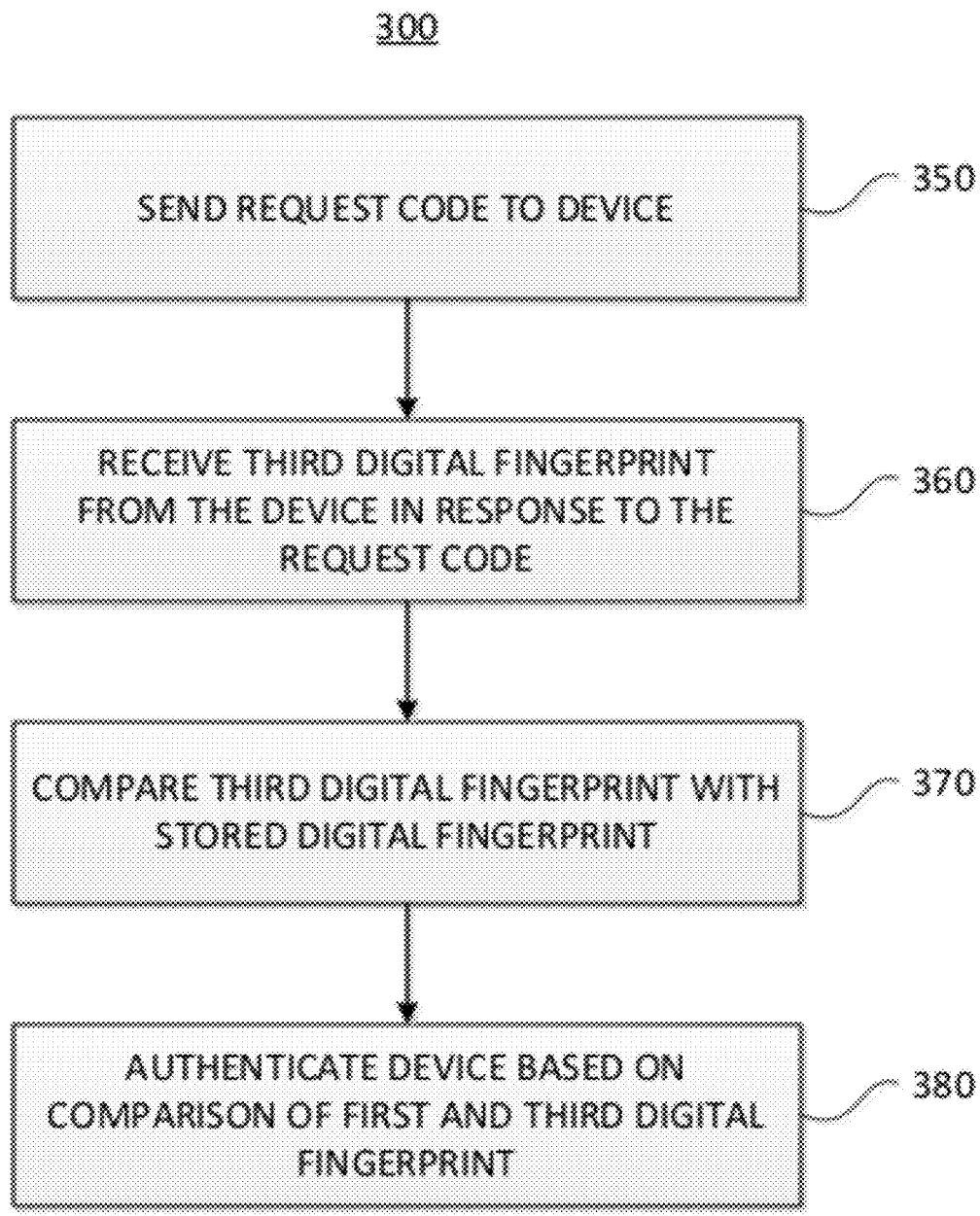
FIG. 3B is a continuation of the process flow diagram of FIG. 3A.

FIGS. 3A-B illustrate an example process flow of a method 300 for authenticating a device, on the authenticating server side, according to one embodiment of the present invention. Referring now to FIG. 3A, method 300 starts at step 310 where a first boot digital fingerprint is received by an authentication server. The first boot digital fingerprint is generated during a first run/boot of an authentication client on the user's device. In one embodiment, when the device first executes the authentication client, the software registers itself and/or the device by sending one or more digital fingerprints of the device to the authentication server. After receiving the one or more digital fingerprints from the device, the authentication server stores the digital fingerprints along with other received information from the device. In one embodiment, the one or more digital fingerprints are associated with the device and user data and then stored in a database.

In step 320, the authentication client receives a second digital fingerprint from the device. The second digital fingerprint may be received at the same time as the first boot fingerprint or at a later date, after the initial registration of the device and/or the authentication client. In step 330, the second digital fingerprint is compared with stored digital fingerprint, which may include the first boot fingerprint. In step 340, in response to the comparison indicating a mismatch between the second digital fingerprint and the plurality of stored digital fingerprints, a request code is generated if the comparison indicates that the second digital fingerprint does not match with any of the stored digital fingerprint. In one embodiment, the comparison is considered to fail there is no exact match between the second digital fingerprint and one of the stored digital fingerprints. Alternatively, the digital fingerprint may be broken up into various portions, and the comparison may be made by portion-to-portion. In this embodiment, the comparison is considered to fail if the portion-to-portion comparison has a matching score of less than a predetermined percentage. The predetermined percentage may be 75%. It should be noted that other percentage may be used as a threshold for the authentication process.

The request code may comprise instructions to the device to generate another digital fingerprint using specific components or machine parameters. For example, the request code may comprise instructions to the device to generate a request code using the machine serial number, machine bus speed;, machine ROM release date; CPU model; CPU voltage, etc. Alternatively, the request code may instruct the device to generate another digital fingerprint using information from the same components used to generate the first boot fingerprint.

Referring now to FIG. 3B, in step 350, the request code is transmitted to the device. Once the request code is received at the device, the authentication client deciphers the code and determines which one or more components of the device to use for generating the digital fingerprint. The components used to generate the digital fingerprint may comprise using one or more typical or non-typical upgrade components and/or user configurable or non-configurable machine parameters of the device. Additionally, the request may be encrypted into a predetermined digits or strings. The strings may have seven or more digits.

Once the digital fingerprint is generated by the device, response code is generated. The response code may represent the requested one or more portions of the generated digital fingerprint. The response code may be encrypted into a number of certain digits, typically seven or more. Once the response code is generated, it may be transmitted to the authenticating server.

In step 360, a third digital fingerprint is received in response to the transmitted request code. In step 370, another comparison is made between the third digital fingerprint and stored digital fingerprints. In step 380, the device may be validly authenticated if an exact match is found. Alternatively, the device may be validly authenticated when the comparison yields a predetermined percentage of matched accuracy. This may be set at 80% or more, for example.

In one embodiment, the authentication process may further include: generating a control metric by comparing differences between the first and second digital fingerprints. The control metric may identify fingerprint portions and their respective components of the device that generated the differences between the first and second digital fingerprints. The control metric may help identify components missing and/or was upgraded in the device. A second metric may also be generated by comparing differences between the first and third digital fingerprints. Each metric may comprise data identifying a fingerprint portion and an associated component that caused the difference. The device may be validly authenticated when the associated component of the control metric and the associated component of the second metric are identical. This means the difference found in the comparison may be caused by a single component. When this is the case, there is a high probability that the changed in the digital fingerprint is caused by an upgrade rather than being caused by an entirely different device.

In one embodiment, in determining how much the third digital fingerprint matches with each of the stored digital fingerprints, the third digital fingerprint may be compared in portions with portions of a stored digital fingerprint. For example, the digital fingerprint may be apportioned into a plurality of logical portions. Each logical portion may represent a digital fingerprint of a single component of the device. When a portion of a digital fingerprint is being compared, the authentication server looks for a matching portion of a stored digital fingerprint. Thus, for example, to pass the threshold of 80% accuracy, 8 out of 10 fingerprint portions must have matching portions on a stored digital fingerprint. Alternatively, a character-to-character comparison can be used to determine the percentage accuracy between two digital fingerprints.

Figure 4:
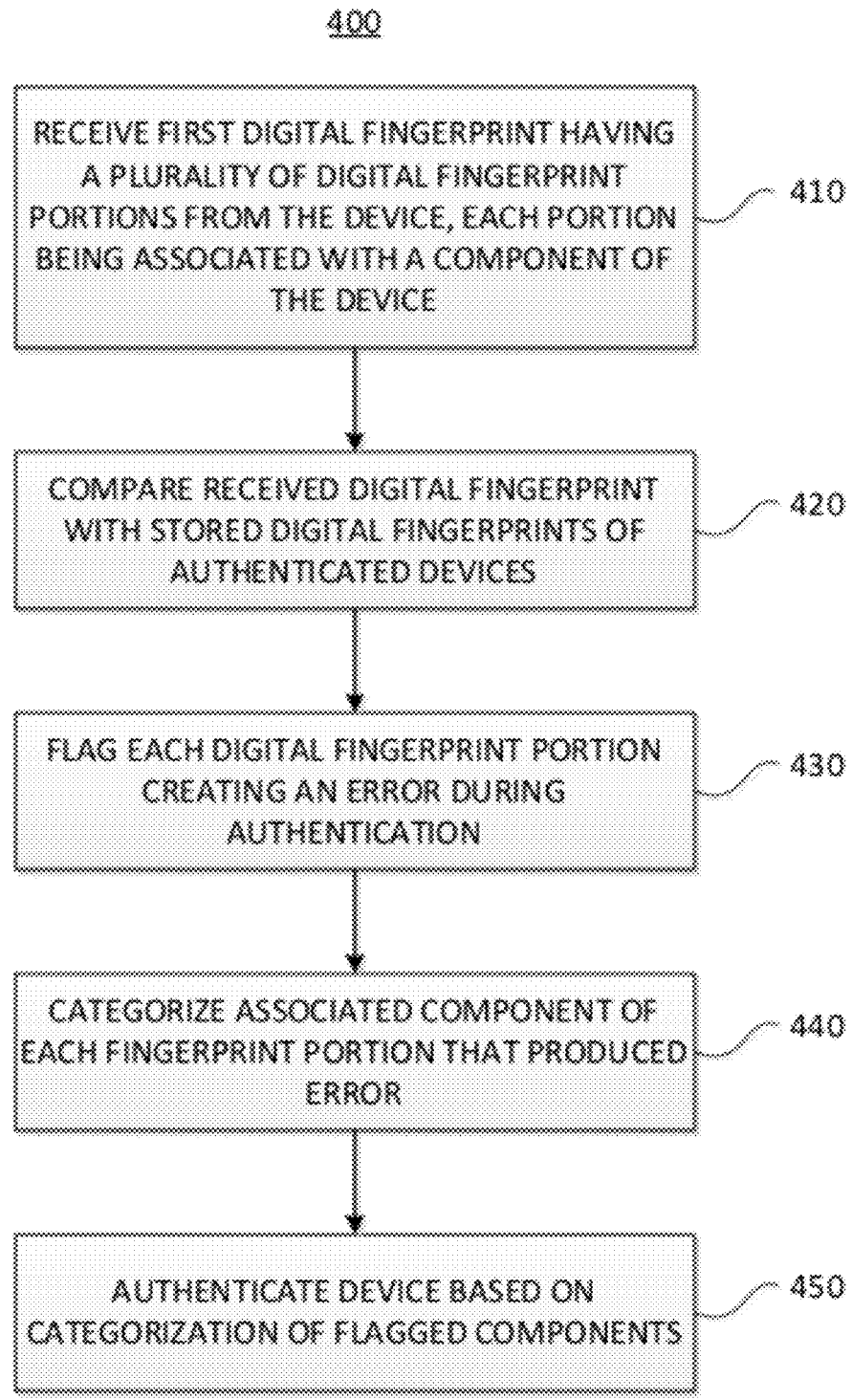
FIG. 4 is a process flow chart illustrating another embodiment of a method according to the invention for device authentication with built-in tolerance.

FIG. 4 illustrates another example process flow of a method 400 for authenticating a device, on the authenticating server side, according to one embodiment of the present invention. Referring now to FIG. 4, method 400 starts at step 410 where a digital fingerprint is received by an authentication server. The digital fingerprint may have a plurality of digital fingerprint portions. In one embodiment, the digital fingerprint may have 5 or more fingerprint portions; each portion representing a digital fingerprint of a component of the device. For example, the fingerprint may comprise ten mini-fingerprints of various components of the device being concatenated into one digital fingerprint.

At step 420, the received digital fingerprint is authenticated against stored digital fingerprints. This is achieved by comparing each portion of the received digital fingerprint with portions of a stored digital fingerprint. Thus, if a portion of the received digital fingerprint matches with any portions of a stored digital fingerprint, then a match of that portion is found. If the authenticating server fails to find a match for a portion of the received digital fingerprint, that portion may be flagged as failed (see step 430). Alternatively, portions having matched portions of stored digital fingerprint may be flagged as passed.

In one embodiment, the device may be authenticated solely based on the ratio of passed and failed digital fingerprint portions. For example, if 80% of the portions are flagged as passed, then the device may be validly authenticated. However, additional safeguards may be added to the authentication process by breaking down the components responsible for the errors. In step 440, each portion of the digital fingerprint is categorized by its respective associated component. As previously mentioned, each digital fingerprint portion was generated at the device using information collected from a component of the device. By decoding the fingerprint portion, information about the component, such as the type of component used to generate the digital fingerprint may be obtained. Once the component information is analyzed, the component may be categorized into categories, such as, for example, typical-upgrade component or non-typical-upgrade component. Thus, each fingerprint portion may be compared against stored fingerprints, flagged as failed or passed, and categorized.

In one embodiment, the authentication process may further include: generating a control metric by comparing differences between the first and second digital fingerprints. The control metric may identify fingerprint portions and their respective components of the device that generated the differences between the first and second digital fingerprints. The control metric may help identify components missing and/or was upgraded in the device. A second metric may also be generated by comparing differences between the first and third digital fingerprints. Each metric may comprise data identifying a fingerprint portion and associated component that caused the difference. The device may be validly authenticated when the associated component of the control metric and the associated component of the second metric are identical. This means the difference found in the comparison may be caused by a single component. When this is the case, there is a high probability that the changed in the digital fingerprint is caused by an upgrade rather than being caused by an entirely different device.

In one embodiment, the authentication server may be configured to parse out the digital fingerprint into a plurality of logical portions. Each logical portion may represent a component of the device that corresponds to a fingerprint portion. During the comparison of a received digital fingerprint from the device with stored digital fingerprints of known devices, the authentication server may flag each portion that it failed to find a match. When the comparison process is completed, the device may be validly authenticated if there are matching portions for at least 75% of the logical portions of the received fingerprint. It should be noted that other percentage could be implemented.

The device may then be authenticated based on the total number of failed fingerprint portions and having a predetermined non-typical-upgrade component/typical-upgrade component ratio (see step 450). In one embodiment, a valid authentication ratio is less than one. The logic is that if a device yields a different digital fingerprint, it may nevertheless be the same device but for a few upgrades. However, if the comparison, flagging, and categorization procedures (step 430-440) indicate that more components responsible for the different fingerprint are non-typical-upgrade components than typical-upgrade components, then chances are the device is a different device. For example, there may be 4 fingerprint portions of a device fingerprint flagged as failed. If the non-typical-upgrade component/typical-upgrade component ratio is 1/3, then the device may be validly authenticated. In contrast, if the ratio is 3/1, then the device fails the authentication process.

Figure 5:
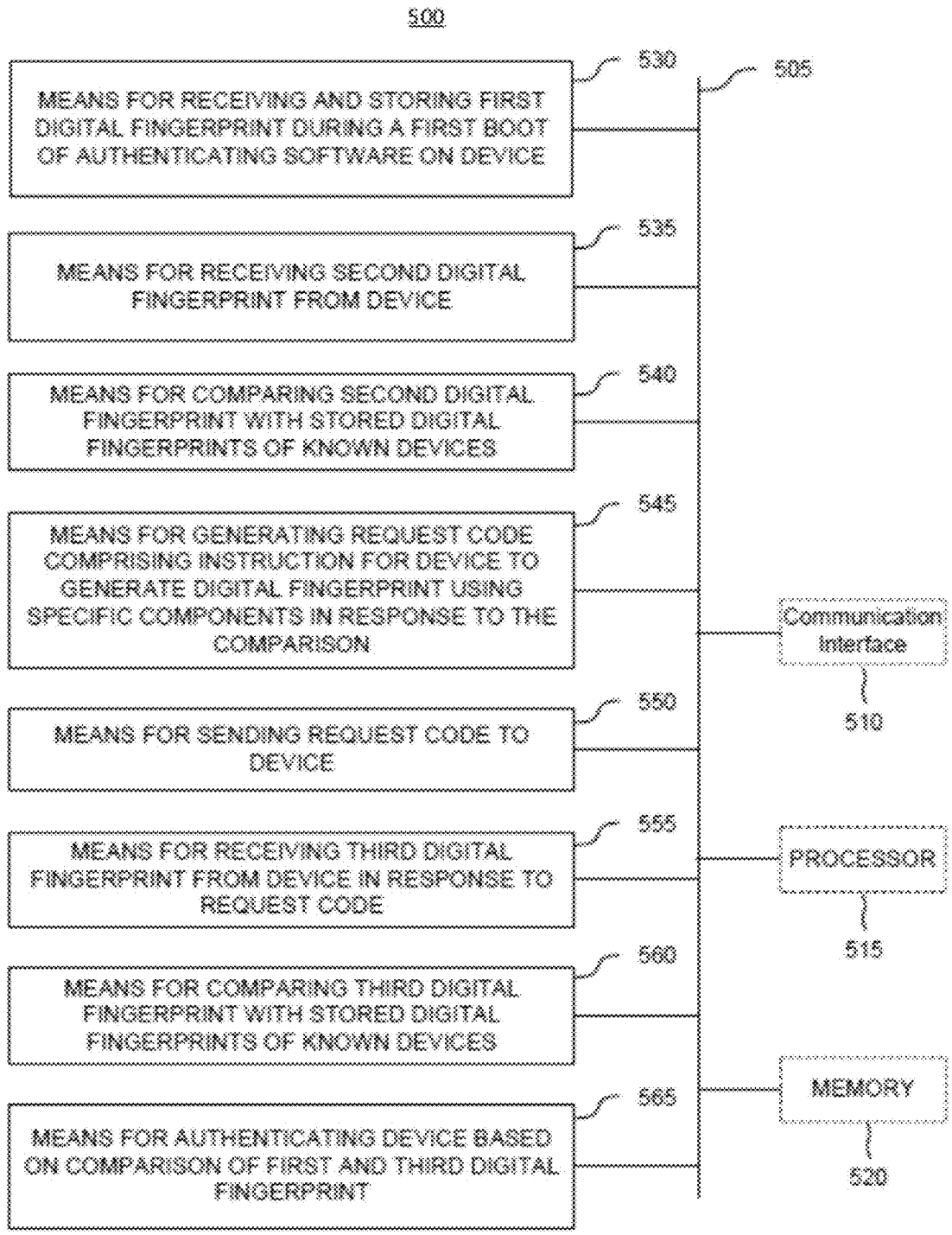
FIG. 5 is a block diagram illustrating a system within which software components can be executed to perform a method for authenticating a device according to one or more embodiments of the present invention.

In accordance with one or more embodiments of the present invention, there are provided devices and apparatuses for authenticating a device. With reference to FIG. 5, there is provided an exemplary apparatus 500 that may be configured as either a computing device, or as a processor or similar device for use within a computing device. As illustrated, apparatus 500 may include: a means 515 for receiving and storing a first digital fingerprint at a first boot of authenticating software/client on a device; a means 535 for receiving a second digital fingerprint from the device; a means 520 for comparing the second digital fingerprint against stored digital fingerprints; and a means 545 for generating a request code to indicate a plurality of components for the device to generate another digital fingerprint for authentication when the comparison yields a predetermined percentage of inaccuracy. In one embodiment, the predetermined percentage of inaccuracy may be 20% or more.

Apparatus 500 may also include: a means 530 for sending out the request code to the device; a means 555 for receiving a third digital fingerprint in response to the request code; a means 560 for comparing the third digital fingerprint with a plurality of stored digital fingerprints; and means 565 for authenticating the device based on the comparison of the third digital fingerprint with stored digital fingerprints.

It is noted that apparatus 500 may include a communications interface 510. Communications interface 510 allows software and data to be transferred between apparatus 500 and external devices. Examples of communications interface 510 may include a modem, a network interface (such as an Ethernet card), a communications port, a PCMCIA slot and card, or the like. Software and data transferred via communications interface 510 are in the form of signals which may be electronic, electromagnetic, optical, or other signals capable of being received by communications interface 510. These signals may be provided to communications interface 510 via a communications path, which may carry signals and may be implemented using wire or cable, fiber optics, a phone line, a cellular phone link, an RF link and other communications channels.

Apparatus 500 may also include processor module 515 having at least one processor, in the case of apparatus 500 configured as computing device, rather than as a processor. Processor 515, in such case, may be in operative communication with means 530-565, and components thereof, via a bus 505 or similar communication coupling. Processor 515 may effect initiation and scheduling of the processes or functions performed by means 530-565, and components thereof.

In further related aspects, apparatus 500 may optionally include a means for storing information, such as, for example, a memory device/module 520. Computer readable medium or memory device/module 520 may be operatively coupled to the other components of apparatus 500 via bus 505 or the like. The computer readable medium or memory device 520 may be adapted to store computer readable instructions and data for effecting the processes and behavior of means 530-580, and components thereof, or processor 520 (in the case of apparatus 500 configured as a computing device) or the methods disclosed herein.

In yet further related aspects, the memory module 520 may optionally include executable code for the processor module 515 to: (a) receive and store a first digital fingerprint from a device; (b) receive a second digital fingerprint from the device; (c) compare the second digital fingerprint with a plurality of stored digital fingerprints; (d) generate a request code when the comparison fails to yield a valid result; (e) send the request code to the device; (f) receive a third digital fingerprint in response to the request code; (g) compare the third digital fingerprint against one or more stored digital fingerprints; and (h) authenticate the device based on the comparison. One or more of steps (a)-(h) may be performed by processor module 515 in lieu of or in conjunction with the means 530-565 described above.

Figure 6:
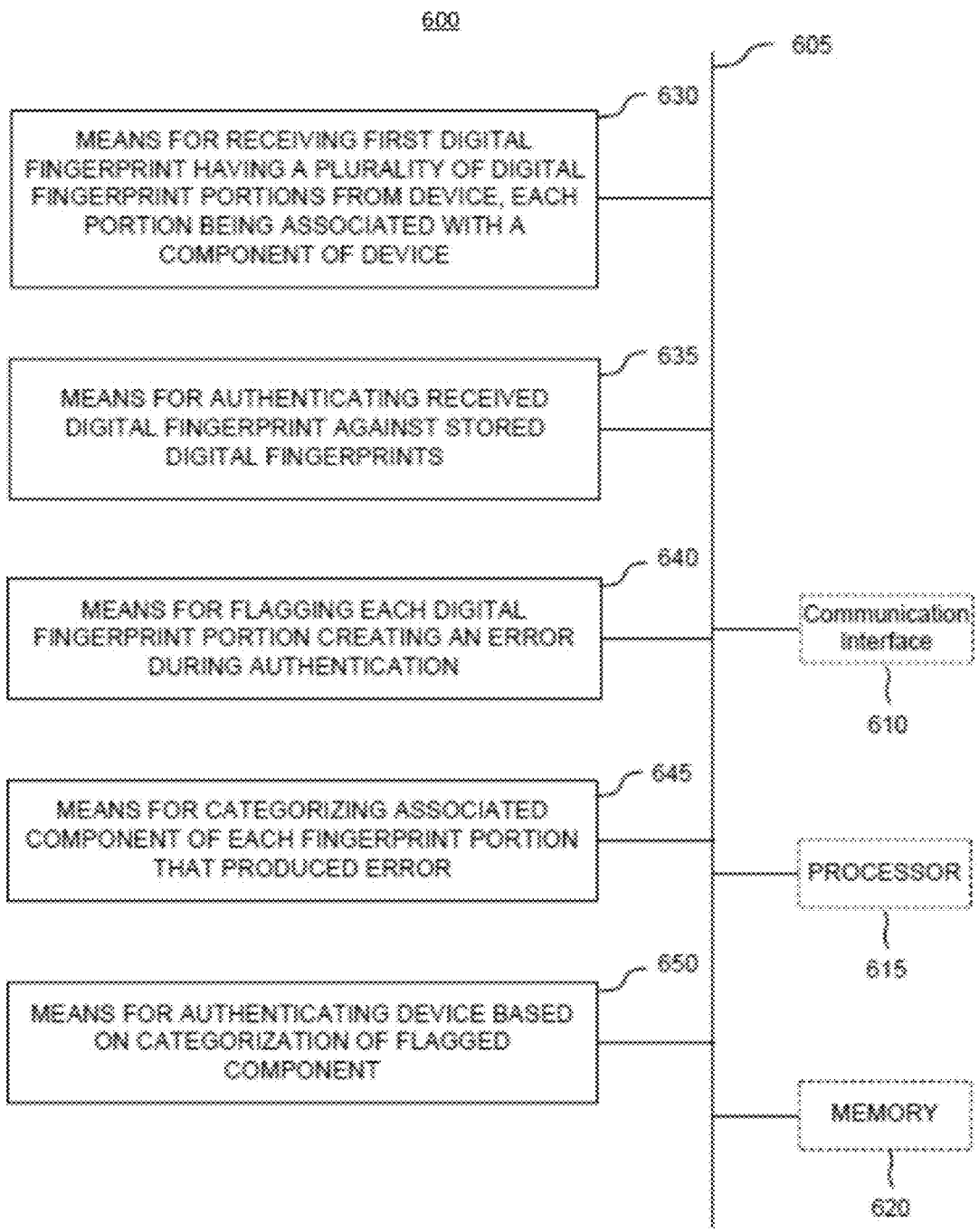
FIG. 6 is a block diagram illustrating another system within which software components can be executed to perform a method for authenticating a device according to one or more embodiments of the present invention.

In accordance with one or more embodiments of the present invention, there are provided devices and apparatuses for authenticating a device. With reference to FIG. 6, there is provided an exemplary apparatus 600 that may be configured as either a computing device, or as a processor or similar device for use within a computing device. As illustrated, apparatus 600 may include: a means 615 for receiving a first digital fingerprint having a plurality of digital fingerprint portions from a device. In generating each fingerprint portion, the device may use information from one or more components of the device. In one embodiment, each fingerprint portion is generated using information from one component. A means 635 for authenticating received digital fingerprint against a plurality of stored digital fingerprints, and a means 630 for flagging each fingerprint portion creating an error or yielding a no match result during the comparison process of means 635 may also be included in apparatus 600.

Apparatus 600 may also include; a means 645 for categorizing associated component of each fingerprint portion that was flagged; and a means 630 for authenticating the device based on the categorization of the flagged portions.

It is noted that apparatus 600 may optionally include a processor module 615 having at least one processor, in the case of apparatus 600 configured as computing device, rather than as a processor. Processor 615, in such case, may be in operative communication with means 630-680, and components thereof, via a bus 610 or similar communication coupling. Processor 615 may effect initiation and scheduling of the processes or functions performed by means 630-650, and components thereof.

Apparatus 600 may include a communications interface 610. Communications interface 610 allows software and data to be transferred between apparatus 600 and external devices. Examples of communications interface 610 may include a modem, a network interface (such as an Ethernet card), a communications port, a PCMCIA slot and card, or the like. Software and data transferred via communications interface 610 are in the form of signals which may be electronic, electromagnetic, optical, or other signals capable of being received by communications interface 610. These signals may be provided to communications interface 610 via a communications path (not shown), which may carry signals and may be implemented using wire or cable, fiber optics, a phone line, a cellular phone link, an RF link and other communications channels.

In further related aspects, apparatus 600 may optionally include a means for storing information, such as, for example, a memory device/module 620. Computer readable medium or memory device/module 620 may be operatively coupled to the other components of apparatus 600 via bus 610 or the like. The computer readable medium or memory device 620 may be adapted to store computer readable instructions and data for effecting the processes and behavior of means 630-650, and components thereof, or processor 640 (in the case of apparatus 600 configured as a computing device) or the methods disclosed herein.

In yet further related aspects, the memory module 620 may optionally include executable code for the processor module 615 to: (a) receive a first digital fingerprint from a device, the first fingerprint having a plurality of portions, each portion being associated with a component of a device; (b) compare each portion of the first digital fingerprint against portions of one or more stored digital fingerprint; (c) flag each portion creating an error or having no match during the comparison process; (d) categorize each component associated with each fingerprint portion; and (e) authenticate the device based on the categorization of flagged components. Steps (a)-(e) may be performed by processor module 615 in lieu of or in conjunction with the means 630-650 described above.

It is noted that one or more of the techniques and methodologies described herein may be performed by embedded applications, platforms, or systems. The methods described herein may be performed by a general-purpose computer system and/or an embedded application or component of a special-purpose apparatus (e.g., traffic controller, traffic signal, surveillance cameras, sensors, detectors, vehicles, vehicle navigation systems, mobile phones, PDAs, etc.).

In one embodiment, the special-purpose device comprises an embedded platform running an embedded Linux operating system (OS) or the like. For example, the unique device identifier or fingerprint for the special-purpose device may be created by collecting and using one or more of the following information: machine model; processor model; processor details; processor speed; memory model; memory total; network model of each Ethernet interface; network MAC address of each Ethernet interface; BlackBox model (e.g., any Flash device); BlackBox serial (e.g., using Dallas Silicone Serial DS-2401 chipset or the like); OS install date; nonce value; nonce time of day; any other predefined hardware information stored (optionally encrypted) in EEPROM; and any variations/combinations thereof.

While the present invention has been illustrated and described with particularity in terms of preferred embodiments, it should be understood that no limitation of the scope of the invention is intended thereby. Features of any of the foregoing methods and devices may be substituted or added into the others, as will be apparent to those of skill in the art. It should also be understood that variations of the particular embodiments described herein incorporating the principles of the present invention will occur to those of ordinary skill in the art and yet be within the scope of the invention.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., Erasable Programmable Read Only Memory (EPROM), card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A method for building tolerance into authentication of a device, comprising:
   receiving and storing a first digital fingerprint of the device during a first boot of an authenticating software on the device, the first digital fingerprint being based on a first set of device components;
   receiving a second digital fingerprint from the device at a subsequent time;
   comparing the second digital fingerprint with a plurality of stored digital fingerprints of known devices;
   in response to the comparison indicating a mismatch between the second digital fingerprint and the plurality of stored digital fingerprints, generating a request code comprising instructions for the device to generate a third digital fingerprint using the first set of device components;
   sending the request code to the remote device;
   receiving the third digital fingerprint from the remote device in response to the request code;
   generating a control metric by encoding one or more differences between the first and second digital fingerprints;
   generating a second metric by encoding one or more differences between the first and third digital fingerprints, wherein each metric comprises data identifying, for each of the one or more differences encoded, a fingerprint portion and associated component portion, the associated component portion identifying a device component that caused a difference to occur during comparison of digital fingerprints, and
   authenticating the device based on a comparison between the control metric and the second metric, wherein the device is validly authenticated when the comparison between the control metric and the second metric determines that an acceptable percentage of the associated components of the control metric and the associated components of the second metric match.

2. The method of claim 1, wherein the first set comprises components from at least one of a typical-upgrade list and a non-typical-upgrade list.

3. The method of claim 2, wherein the typical-upgrade list comprises one or more components selected from the group consisting of graphic card, random access memory, sound card, network adaptor, hard drive, CD/DVD drive, and Ethernet controller.

4. The method of claim 2, wherein the non-typical-upgrade list comprises one or more components selected from the group consisting of motherboard, USB host controller, central microprocessor, PCI Bus, and System CMOS Clock.

5. The method of claim 1, wherein the device is validly authenticated when the comparison of the first and third digital fingerprints yields an accuracy of at least 75%.

6. The method of claim 1, wherein the acceptable percentage is 100%.

* * * * *